United States Patent [19]

Umpleby

[11] Patent Number: 4,574,133

[45] Date of Patent: Mar. 4, 1986

[54] POLYMER COMPOSITION

[75] Inventor: Jeffrey D. Umpleby, Ferney-Voltaire, France

[73] Assignee: BP Chemicals Limited, London, England

[21] Appl. No.: 682,193

[22] Filed: Dec. 17, 1984

[30] Foreign Application Priority Data

Jan. 5, 1984 [GB] United Kingdom ............... 8400149

[51] Int. Cl.⁴ .......................................... C08K 5/51
[52] U.S. Cl. ................................. 524/147; 523/223; 525/370; 524/177; 524/178
[58] Field of Search .............. 523/223; 524/147, 177, 524/178; 525/370

[56] References Cited

U.S. PATENT DOCUMENTS

| | | | |
|---|---|---|---|
| 2,480,790 | 8/1949 | Truhler et al. | 524/147 |
| 4,223,071 | 9/1980 | Boyer et al. | 524/147 |
| 4,353,997 | 10/1982 | Keogh | 524/409 |
| 4,413,066 | 11/1983 | Isaka et al. | 521/149 |

Primary Examiner—Joseph L. Schofer
Assistant Examiner—N. Sarofin
Attorney, Agent, or Firm—Brooks, Haidt, Haffner & Delahunty

[57] ABSTRACT

A crosslinkable composition comprising a silyl modified ethylene (co)polymer, a defined phosphorus or antimony compound and optionally a silanol condensation catalyst. The silyl modified polymer has hydrolysable silane groups introduced therein by copolymerization grafting or transesterification. The phosphorus or antimony compound (e.g. tributyl phosphite) reduces premature crosslinking during extrusion of the composition.

16 Claims, No Drawings

POLYMER COMPOSITION

The present invention relates to crosslinkable organic polymer compositions.

It is known that organic polymers containing hydrolysable silane groups can be crosslinked by the action of water, preferably in the presence of a so-called silanol condensation catalyst. A number of methods are known for producing such crosslinkable organic polymers. One method comprises copolymerising unsaturated organic monomers with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a radical polymerisation initiator. Another example of this copolymerisation method is described in GB-A-1415194 which discloses the preparation of crosslinkable copolymer by contacting ethylene, optionally with other olefinically unsaturated comonomer, and a terminally unsaturated silane compound with certain defined Ziegler catalysts under polymerisation conditions which preferably employ relatively low temperatures and pressures.

Another known method for making such crosslinkable organic polymers containing hydrolysable silane groups comprises graft-copolymerising an ethylenically unsaturated silane compound on to an organic polymer preferably in the presence of a free radical initiator. Examples of this method are disclosed in GB-A-1357549, GB-A-1234034 and GB-A-1286460. The graft-copolymerisation method forms the basis of the well-known "SIOPLAS" (RTM) commercial technique for making crosslinkable ethylene/silane copolymers. In the well known single-step "MONOSIL" (RTM) process for making crosslinkable compositions of this type an ethylenically unsaturated silane compound is graft-polymerised onto an organic polymer in the presence of a free radical initiator and a silanol condensation catalyst. In this process the grafting reaction is performed simultaneously with the fabrication of the polymeric article, for example, by feeding the organic polymer, the unsaturated silane compound, the initiator and the silanol condensation catalyst (optionally with conventional additives) to an extruder wherein the grafting reaction occurs and a crosslinkable product is extruded directly.

Crosslinkable organic polymers having hydrolysable silane groups (hereinafter referred to as "silyl modified polymers") can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed.

A problem encountered with silyl modified polymers is that during storage or thermoforming operations the polymer can undergo premature crosslinking and this can lead to difficulties in the fabrication of articles from the polymer or to the production of articles having unsatisfactory physical and mechanical properties. The problem of crosslinking during storage may be reduced by ensuring that the silyl modified polymers are maintained in a moisture-free environment and by keeping the silanol condensation catalyst (or other additives known to promote crosslinking) separate from the polymer until the fabrication step is preformed. A technique frequently employed in the art is to make up a concentrated masterbatch containing the silanol condensation catalyst and other additives if any, in an organic polymer which does not spontaneously crosslink and which is compatible with the silyl modified polymer, and to blend this masterbatch with the silyl modified polymer during or just prior to thermoforming of the desired article. The fabricated article is then exposed to water, steam or moist air to cause crosslinking.

Problems resulting from premature crosslinking during thermoforming are more difficult to overcome. One method of reducing premature crosslinking proposed in GB-A-1357549 is to mould or extrude articles from silyl modified polymers in the absence of the silanol condensation catalyst and then to contact the produced article with an aqueous dispersion or solution of a tin carboxylate to cause the crosslinking.

It is an object of the present invention to provide an improved crosslinkable silyl modified polymer composition. It is a further object of the present invention to provide a crosslinkable silyl modified polymer composition which exhibits a reduced tendency to undergo premature crosslinking during the fabrication of articles therefrom.

Accordingly, the present invention provides a crosslinkable composition comprising a silyl modified ethylene (co) polymer and a phosphorus or antimony compound containing at least one X-R group wherein X represents the phosphorus or antimony, R is a hydrogen atom or is an organic substituent which is bonded to atom X via a carbon or oxygen atom and wherein X is in the trivalent or pentavalent state.

A preferred embodiment of the present invention provides a crosslinkable composition comprising a silyl modified ethylene (co) polymer, a phosphorus or antimony compound containing at least one X-R group wherein X represents the phosphorus or antimony, R is a hydrogen atom or is an organic substituent which is bonded to atom X via a carbon or oxygen atom and wherein X is in the trivalent or pentavalent state, and a silanol condensation catalyst.

In the present invention the silyl modified ethylene (co) polymer is an organic polymer having hydrolysable silane groups and can be, for example, a polymer prepared by copolymerising monomeric material comprising ethylene with an unsaturated silane compound having hydrolysable groups or can be, for example, a graft polymer prepared by grafting an unsaturated silane compound having hydrolysable silane groups on to a polyethylene or an ethylene copolymer. Preferred silyl modified polymers are copolymers prepared by copolymerising ethylene, optionally together with one or more alpha-olefins, vinyl esters, alkyl(meth)acrylates, unsaturated nitriles or unsaturated ethers, with an unsaturated silane compound in the presence of a free radical initiator. Also preferred are graft polymers prepared by grafting an unsaturated silane compound on to polyethylene or on to a copolymer of ethylene with one or more alpha-olefins, vinyl esters, alkyl(meth)acrylates, unsaturated nitriles or unsaturated ethers (eg vinyl ethers), by heating the polyethylene, or copolymer of ethylene, with the unsaturated silane compound in the presence of a free radical initiator, for example, an organic peroxide. The polyethylene or copolymer of ethylene can comprise, for example, low density polyethylene, low density ethylene hydrocarbon copolymers (e.g. LLDPE), high density polyethylene, ethylene/ethyl acrylate copolymer, ethylene/vinyl acetate copolymer or ethylene propylene rubber (EPR)

The silyl modified polymer can be formed "in situ" in the presence of the other component(s) of the composition of the present invention, for example, by grafting an unsaturated silane compound on to polyethylene or on to a copolymer of ethylene of the type described above in the presence of a free radical polymerisation initiator and in the presence of the defined phosphorus or antimony compound and optionally in the presence of a silanol condensation catalyst.

The silane compound copolymerised with the ethylene, or graft copolymerised with the polyethylene or copolymer of ethylene, is preferably a compound having the general formula $R^1SiR^2_mY_{3-m}$ wherein $R^1$ represents an ethylenically unsaturated hydrocarbyl or hydrocarbyloxy group; $R^2$ represents an aliphatic saturated hydrocarbyl group; Y represents a hydrolysable organic group; and m represents zero, 1 or 2. Preferred unsaturated silane compounds for use in making the copolymer or graft copolymer are vinyl trimethoxy silane, vinyl triethoxy silane, vinyl tris(methoxyethoxy) silane and vinyl triacetoxy silane.

Another method for forming silyl modified copolymers which can be employed in the composition of the present invention is the known "transesterification" method. In this method, for example, the alkoxy groups present in an ethylene/alkyl(meth)acrylate copolymer can be "ester exchanged" or replaced by a silane substituent bearing hydrolysable groups by reacting the copolymer with a suitable silane compound in the presence of a catalyst (for example, titanium tetraisopropylate). Examples of suitable silane compounds are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. The transesterification method can also be used to prepare silyl modified copolymers by reacting an ethylene/vinyl acetate copolymer with a suitable silane compound bearing hydrolysable groups and having esterified carboxylic acid goups which exchange with the acetate groups on the copolymer. A suitable silane compound is 4-[tri(m)ethoxysilyl] butanoic acid (m)ethyl ester.

Silyl modified polymers particularly preferred for use in the composition of the present invention are copolymers prepared by copolymerising ethylene, optionally together with up to 40% by weight (based on ethylene) of additional monomer selected from one or more vinyl esters or (meth)acrylates, and an unsaturated silane compound selected from vinyl trialkoxy silanes, vinyl tris(alkoxyalkoxy) silanes and vinyl triacetoxy silane, under a pressure of from 500 to 4000 bars and at a temperature in the range 150° to 400° C. in the presence of a free radical polymerisation initiator.

The silyl modified polymer employed in the present invention is preferably a copolymer or a graft copolymer containing 0.1–10 wt %, most preferably 0.5 to 5 wt % of copolymerised units of the silane compound. Preferably the silyl modified polymer has a melt index (ISO 1133, 190° C., 2.16kg load) of 0.02 to 5 g/10 mins.

For further details of silyl modified polymers suitable for use in the present invention reference may be made to GB-A-2028831, GB-A-2039513, GB-A-1357549, GB-A-1415194, GB-A-1286460, GB-A-1234034 and U.S. Pat. No. 3,225,018.

Examples of classes of phosphorus compounds suitable for use in the present invention are organic phosphites, organic phosphonites, organic phosphines and organic phosphine oxides. The organic substituent R can be for example a hydrocarbyl group, an organic hetero-group or a hydrocarbyloxy group. The organic substituent R is preferably an alkoxyl or an aryloxy substituent, most preferably an alkoxyl substituent containing 1–30 carbon atoms. Preferred phosphorus compounds employed in the present invention are selected from those having the general formulae $R^4R^5POH$ and $R^4R^5P-R^6-(PR^7R^8)_n$ wherein $R^4, R^5, R^7$ and $R^8$ are the same or different and represent groups selected from alkyl, alkoxy, aryl or aryloxy groups each having up to 30 carbon atoms, and n is zero or one. When n is zero $R^6$ is selected from alkyl, aloxy, aryl or aryloxy having 1 to 30 carbon atoms, preferably alkyl or alkoxyl having 3 to 12 carbon atoms. When n is one, $R^6$ is a divalent group, for example, alkylene, arylene, or —OMO— wherein O is oxygen and M is an alkylene or arylene group. In the case that n is zero, preferably at least one, and most preferably all, of the groups $R^4, R^5, R^6$, are alkyl or alkoxyl groups containing 3 to 12 carbon atoms. In the case that n is one, preferably at leastone and most preferably all the groups $R^4, R^5, R^7$ and $R^8$ are alkyl or alkoxyl groups having 3 to 12 carbon atoms.

Examples of phosphorus compounds preferred for use in the composition of the present invention are dialkyl or trialkyl phosphites, for example tributyl phosphite, tri-n-hexyl phosphite, tri-iso-octylphosphite, trinonylphosphite and di-iso-octylphosphite.

Triphenyl stibine is an example of a suitable antimony compound.

The quantity of phosphorus or antimony compound employed in the present invention is suitably in the range 0.001 to 3.0 moles, preferably 0.003 to 0.05 moles per mole of silyl units in the organic silyl modified polymer.

In the preferred embodiment of the present invention a silanol condensation catalyst is present in the crosslinkable composition. Any of the silanol condensation catalysts known in the art for crosslinking silyl modified polymers can be suitably employed in the present invention. Examples of suitable classes of silanol condensation catalysts are organic and inorganic acids and alkalis, and metal compounds, for example complexes or carboxylates of lead, cobalt, iron, nickel, zinc or tin. Specific examples of the silanol condensation catalyst are dibutyl tin dilaurate, dibutyl tin diacetate, dibutyl tin dioctoate, stannous acetate, stannous caprylate, lead naphthenate, zinc caprylate, cobalt naphthenate; ethylamines, dibutylamine, hexylamines, pyridine; inorganic acids such as sulfuric acid and hydrochloric acid; and organic acids such as toluenesulfonic acid, acetic acid, stearic acid and maleic acid. Carboxylates of tin are preferred. Particularly preferred silanol condensation catalysts are dialkyl tin dicarboxylates, for example dibutyl tin dilaurate, dibutyl tin dipalmitate, dibutyl tin distearate and dioctyl tin dilaurate.

The quantity of silanol condensation catalyst employed in the preferred embodiment of the present invention is suitably in the range 0.001 to 3.0 moles, preferably in the range 0.003 to 0.05 moles per mole of silyl units in the silyl modified polymer.

Generally speaking, the quantity of the catalyst to be blended into the composition is in the range of 0.001 to 10 % by weight, preferably 0.01 to 5% by weight particularly preferably 0.03 to 3% by weight, relative to the quantity of the silyl modified polymer in the composition.

Preferably the mole ratio of phosphorus or antimony compound:silanol condensation catalyst lies in the range 1:10 to 10:1, most preferably in the range 1:3 to 5:1.

According to a particularly preferred embodiment of the present invention the crosslinkable composition comprises the defined silyl modified polymer having hydrolysable silyl groups, the defined phosphorus or antimony compound and the defined silanol condensation catalyst characterised in that the phosphorus or antimony compound and the silanol condensation are capable of reacting together to form a complex which is hydrolysable by water. An example of a phosphorus compound and a silanol condensation catalyst which react to give a water-hydrolysable complex is tributyl phosphite/dibutyl tin dilaurate. Hydrolysable complexes of this type may be prepared for example by blending the components (i.e. the phosphorus or antimony compound and the silanol condensation catalyst) together with the silyl modified polymer; or by blending the components with a polymeric material compatible with the silyl modified polymer to form a masterbatch; or merely by mixing the components together in the presence or absence of diluent to form the complex which can be blended with polymeric material to form a masterbatch or which can be directly incorporated into the silyl modified polymer to form a crosslinkable composition in accordance with the present invention.

In another preferred embodiment of the present invention, a crosslinkable composition is prepared by a process comprising feeding to an extruder
(a) organic polymer comprising polyethylene or a copolymer of ethylene with one or more alpha-olefins, vinyl ethers, vinyl esters, alkyl(meth)acrylates or unsaturated nitriles,
(b) 0.1–10 weight %, preferably 0.5 to 5 weight % based on organic polymer of an unsaturated silane compound having hydrolysable organic groups,
(c) 0.01 to 1 weight %, preferably 0.05 to 0.5 weight % based on organic polymer of an organic peroxy free-radical initiator
(d) 0.001 to 3.0 moles, preferably 0.003 to 0.05 moles per mole of unsaturated silane compound of a silanol condensation catalyst and
(e) 0.001 to 3.0 moles, preferably 0.003 to 0.05 moles per mole of unsaturated silane compound of the phosphorus or antimony compound as herein defined, under conditions such that the mixture forms a homogeneous melt and the unsaturated silane compound becomes grafted to the organic polymer. The techniques which can be employed in preparing a crosslinkable composition in accordance with this preferred embodiment of the present invention can be, for example, those known in the well known single-step "Monosil" (RTM) process. A method of this type is described in GB1526398. The preferred phosphorus or antimony compound to be employed in this embodiment are as hereinbefore described.

The composition of the present invention can contain additives conventionally employed in the art. Examples of such additives are antioxidants, fillers, metal deactivators (e.g. salicylaldehyde oximes), lubricants, water-tree inhibitors, flame retardants and pigments. Additives of this type are conventionally incorporated into the composition either directly or by a masterbatching technique.

A further aspect of the present invention provides a masterbatch suitable for blending with a silyl modified polymer to form a crosslinkable composition, the masterbatch comprising an ethylene homopolymer or a copolymer of ethylene with up to 40% by weight of copolymerised units of one or more other 1-olefins, vinyl esters or (meth)acrylates, a phosphorus or antimony compound as herein defined and a silanol condensation catalyst.

The composition of the present invention can be used to manufacture crosslinked products using the technology known in the manufacture of articles from conventional silyl modified polymers of this type. For example, the composition can be use in blow-moulding, injection-moulding, film-blowing, calendering, extrusion, rotomoulding and extrusion-coating techniques. The composition is particularly preferred for wire and cable coating applications. Wire and cable insulation produced by extrusion coating using the composition of the present invention exhibits improved surface finish.

Articles fabricated from the composition of the present invention can be crosslinked by exposure to water, steam or moist air, preferably in the presence of a silanol condensation catalyst, and, in general, relatively fast rates of cure are obtained. If desired, articles manufactured from the composition of the present invention can be crosslinked by contacting with an aqueous slurry or suspension of the silanol condensation catalyst.

The invention is illustrated in the following Examples and Comparative Test.

EXAMPLES 1–3 AND COMPARATIVE TEST A

Masterbatches were prepared by compounding together the components (see Table 1) in a Werner and Pfleiderer ZSK 30 twin screw extruder at a screw speed of 200 revolutions per minute. The total quantity of composition prepared in each Example and in the Test was 10 Kg per run. The extruder temperature was about 140° C. close to the hopper zone, increasing to 190° C. at the extruder head. Extrusion was carried out to give a strand which was chopped to give a pelleted masterbatch.

The pelleted masterbatch (5 parts by weight) was dry blended with 95 parts by weight of a silyl modified polymer prepared by copolymerising ethylene with vinyl trimethoxy silane under high temperature and high pressure conditions using a free radical initiator. The silyl modified polymer contained 1.8 weight % of copolymerised vinyl trimethoxy silane, had a melt index (190° C., 2.16 Kg load) of 0.7 and a density of 923 Kg/m$^3$.

The dry blend was fed into the hopper of a Gottfert extruder equipped with a 25 mm screw having L:D of 23:1 and a 5 cm slot-casting die having a 3 mm die gap to produce an extruded tape. The die temperature was 210° C. and the screw speed was 40 RPM. The extrudate was collected on a conveyor belt moving at a rate such that the tape thickness was maintained at 1.5±0.1 mm. The extruded tape was cured by immersion in a water bath thermostated at 80° C. Visual examination of the tapes produced using the composition of the present invention (i.e. Examples 1–3) showed that the tapes were relatively free from surface imperfections and defects caused by premature crosslinking (i.e. crosslinking during extrusion). Tape having similar characteristics continued to be extruded even after 1 hours extrusion time. On the other hand, tape produced from the composition of Comparative Test A exhibited substantial surface irregularity caused by premature crosslinking in the extruder.

Samples of the crosslinked extruded tapes were were subjected to heat elongation testing according to IEC 540 (200° C., 20 g/mm², 15 minutes). The heat elongation figures are recorded in Table 2 for tapes cured for, respectively, 1 hour and 3 hours.

TABLE 1

| Component | Example 1 | Example 2 | Example 3 | Comparative Test A |
|---|---|---|---|---|
| Tributyl phosphite | 1.0 | 0.41 | — | — |
| Triisoctyl phosphite | — | — | 1.0 | — |
| Dibutyl tin dilaurate | 1.0 | 1.0 | 1.0 | 1.0 |
| Slip agent | 1.0 | 0.7 | 1.0 | 1.0 |
| Antioxidant | 5.0 | 5.0 | 5.0 | 5.0 |
| Low density PE | 92.0 | 92.89 | 92.0 | 93.0 | parts by weight

TABLE 2

| | % Elongation after 1 hour cure | % Elongation after 3 hour cure |
|---|---|---|
| Example 1 | 60 | 35 |
| Example 2 | 85 | 40 |
| Example 3 | 140 | 60 |
| Comparative Test A | 150 | 60 |

I claim:

1. A crosslinkable composition comprising a silyl modified ethylene (co) polymer and a phosphorus or antimony compound containing at least one X-R group wherein X represents the phosphorus or antimony, R is a hydrogen atom or is an organic substituent which is bonded to atom X via a carbon or oxygen atom and wherein X is in the trivalent or pentavalent state and further comprising a silanol condensation catalyst.

2. A composition as claimed in claim 1 wherein the silyl modified ethylene (co) polymer is the product of copolymerising monomeric material comprising ethylene together with one or more alpha-olefins, vinyl esters, alkyl methacrylates, unsaturated nitriles or unsaturated ethers with an unsaturated silane compound having hydrolysable silane groups.

3. A composition as claimed in claim 1 wherein the silyl modified ethylene (co) polymer is a graft polymer prepared by grafting an unsaturated silane compound having hydrolysable silane groups on to a polyethylene or an ethylene copolymer.

4. A composition as claimed in claim 1 prepared by grafting an unsaturated silane compound on to polyethylene or on to a copolymer of ethylene in the presence of a free radical polymerisation initiator, the phosphorus or antimony compound and a silanol condensation catalyst.

5. A composition as claimed in claim 1 wherein the silyl modified ethylene (co) polymer is a graft polymer prepared by silane-grafting on to polyethylene or a copolymer of ethylene with one or more alpha-olefins, vinyl esters, alkyl(meth)acrylates, unsaturated nitriles or unsaturated ethers.

6. A composition as claimed in claim 2 wherein the silyl modified ethylene (co) polymer is prepared by copolymerising the monomeric material and the unsaturated silane compound under a pressure of 500 to 400 bars and at a temperature in the range 150° to 400° C. in the presence of a free radical initiator.

7. A composition as claimed in claim 1 wherein the phosphorus compound is an organic phosphite, organic phosphonite, organic phosphine or an organic phosphine oxide.

8. A composition as claimed in claim 1 wherein the phosphorus compound is a dialkyl phosphite or trialkyl phosphite.

9. A composition as claimed in claim 1 wherein the silane groups present in the silyl modified polymer are derived from vinyl trimethoxy silane, vinyl triethoxy silane, vinyl tris(methoxy ethoxy)silane or vinyl triacetoxy silane.

10. A process for insulating wire or cable comprising extrusion coating the composition claimed in claim 1 on to wire or cable and crosslinking the coating by exposure to water, steam or moist air.

11. A composition as claimed in claim 8 wherein the phosphorus compound is selected from the group consisting of tributyl phosphite, tri-n-hexyl phosphite, tri-iso-octyl phosphite, tri-nonyl phosphite and di-iso-octylphosphite.

12. A composition as claimed in claim 8 wherein the phosphorus compound is tributyl phosphite.

13. A composition as claimed in claim 1, wherein the compound is an antimony compound containing at least one X-R group wherein X represents the antimony, R is a hydrogen atom or is an organic substituent which is bonded to atom X via a carbon or oxygen atom and wherein X is in the trivalent or pentavalent state.

14. A composition as claimed in claim 13, wherein the antimony compound is triphenyl stibine.

15. A process for the prepartion of a crosslinkable composition comprising feeding to an extruder
(a) organic polymer comprising polyethylene or a copolymer of ethylene with up to 40% by weight of one or more alpha-olefins, vinyl ethers, vinyl esters, alkyl(meth) acrylates or unsaturated nitriles,
(b) 0.1-10 weight %, based on said organic polymer, of an unsaturated silane compound having hydrolysable organic groups,
(c) 0.01 to 1 weight %, based on said organic polymer, of an organic peroxy free-radical initiator,
(d) 0.001 to 3.0 moles, per mole of unsaturated silane compound, of a silanol condensation catalyst, and
(e) 0.001 to 3.0 moles, per mole of unsaturated silane compound, of a phosphorus or antimony compound containing at least one X-R group wherein X represents the phosphorus or antimony, R is a hydrogen atom or is an organic substituent which is bonded to atom X via a carbon or oxygen atom and wherein X is in the trivalent or pentavalent state,
under conditions such that the mixture forms a homogeneous melt and the unsaturated silane compound becomes grafted to the organic polymer.

16. A process for reducing the tendency to undergo premature crosslinking of a crosslinkable composition comprising a silyl modified ethylene (co) polymer,
which process comprises incorporating into said crosslinkable composition, an amount effective to reduce the tendency to undergo premature crosslinking,
of a phosphorus compound or an antimony compound, containing at least one X-R group wherein X represents the phosphorus or antimony, R is a hydrogen atom or is an organic substituent which is bonded to atom X via a carbon oxygen atom and wherein X is in the trivalent or pentavalent state, and further comprising a silanol condensation catalyst.

* * * * *